United States Patent [19]

Reiterman et al.

[11] Patent Number: 5,183,363
[45] Date of Patent: Feb. 2, 1993

[54] NON-CONTACT COOLANT SUPPLY APPARATUS

[75] Inventors: Lee Reiterman, Royal Oak; Dale D. Martin, Sterling Heights; Joseph Krysik, Ortonville, all of Mich.

[73] Assignee: GTE Valenite Corporation, Troy, Mich.

[21] Appl. No.: 916,297

[22] Filed: Jul. 17, 1992

[51] Int. Cl.⁵ .............................................. B23B 47/34
[52] U.S. Cl. .................................... 408/59; 409/136
[58] Field of Search ......................... 408/56, 57, 59; 409/135, 136; 407/11

[56] References Cited

U.S. PATENT DOCUMENTS

| | | | |
|---|---|---|---|
| 3,073,189 | 1/1963 | Paige | 408/59 |
| 3,096,668 | 7/1963 | Maynard | 408/59 |
| 3,791,660 | 2/1974 | Bostley | 408/59 |
| 4,636,118 | 1/1987 | Hunt | 408/59 |
| 4,668,135 | 5/1987 | Hunt | 408/59 |
| 4,693,646 | 9/1987 | Andrews | 408/59 |

FOREIGN PATENT DOCUMENTS 369154 5/1990 European Pat. Off. ............ 409/136

Primary Examiner—Daniel W. Howell
Attorney, Agent, or Firm—Bill C. Panagos

[57] ABSTRACT

A non-contact coolant supply apparatus for supplying coolant for cutting a workpiece wherein there is relative cutting motion about an axis of rotation between a cutting member mounted on a tool shank.

7 Claims, 1 Drawing Sheet

NON-CONTACT COOLANT SUPPLY APPARATUS

BACKGROUND OF THE INVENTION

1. Field of the Invention

The present invention relates to a non contact coolant supply apparatus which supplies coolant to a rotating cutting tool without passage through machine components, and without causing premature wear to seals, bearings or other components.

2. Description of the Related Art

Hunt, U.S. Pat. No. 4,668,135 relates to a coolant supply in a rotary tool wherein a cutting operation coolant is supplied from a coolant supply means through a coolant supply member which is spaced from a tool shank mounted supply ring. A valve is included for preventing leakage at the space between the coolant supply means and the supply ring when the coolant is being supplied.

Hunt differs from the present invention because the present invention does not include a valve or seal means between the coolant supply and the rotating tool.

SUMMARY OF THE INVENTION

The present invention is directed to a non-contact, coolant supply apparatus for a rotating cutting tool. The invention is comprised of a shank having at least one helical coolant passage formed in the outside diameter of the shank wherein coolant is supplied from a coolant passage means through a ring bore defined by ring bore walls which extend from an outer peripheral surface to an inner peripheral surface of coolant supply ring which is fixedly mounted. The tool shank passes through the coolant supply ring with a small clearance therebetween such that the inner peripheral surface is positioned over the annular groove on the tool shank so that coolant is introduced through the ring bore onto the annular groove and via the helical groove, is forced to flow over or in close proximity to the cutting members. The rotation of the tool shank causes the helical coolant passage to act as an impeller to force the coolant through the tool coolant passages and onto the cutting members. It is contemplated that the coolant supply ring could be formed with an annular groove formed along its inner peripheral surface to act as a reservoir for the coolant. In addition, it is further contemplated that the helical groove will have tubes inserted therein to extend the helical grooves into the path of the coolant.

DETAILED DESCRIPTION OF THE PREFERRED EMBODIMENT

Figure 1:
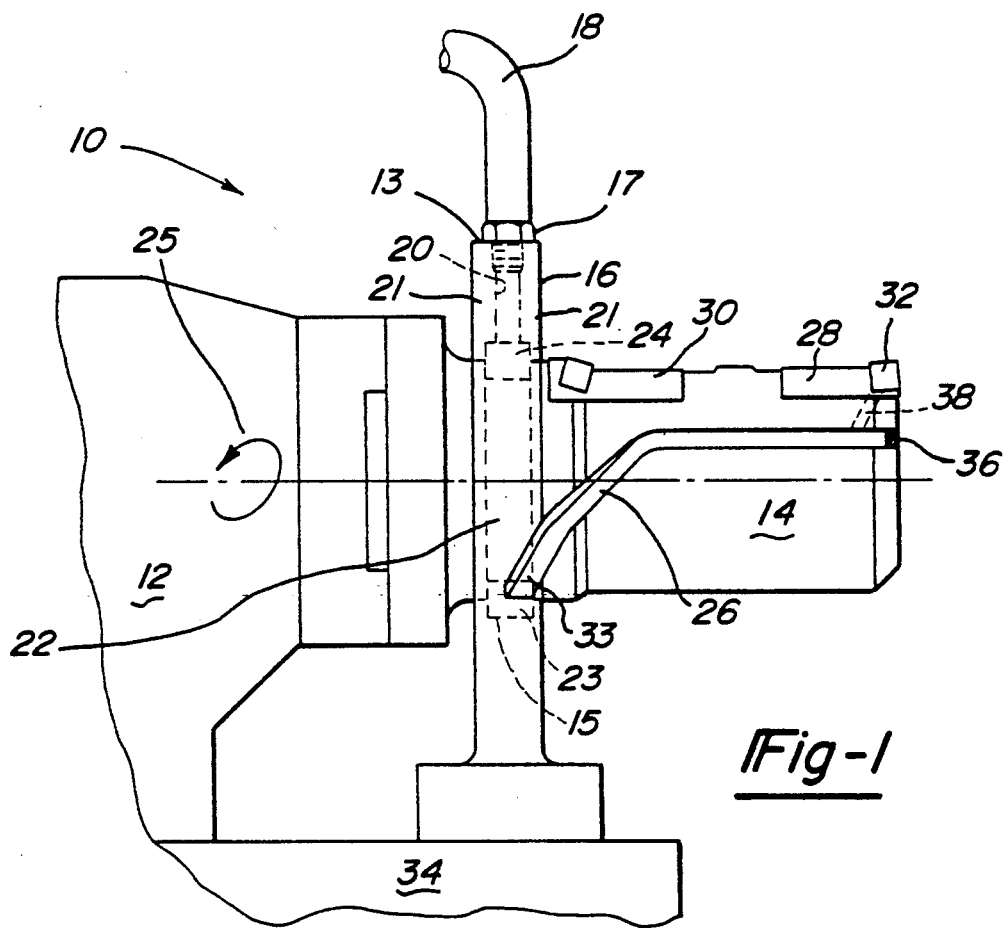
FIG. 1 is a side view of the non contact coolant supply apparatus and a cutting tool.
Figure 2:
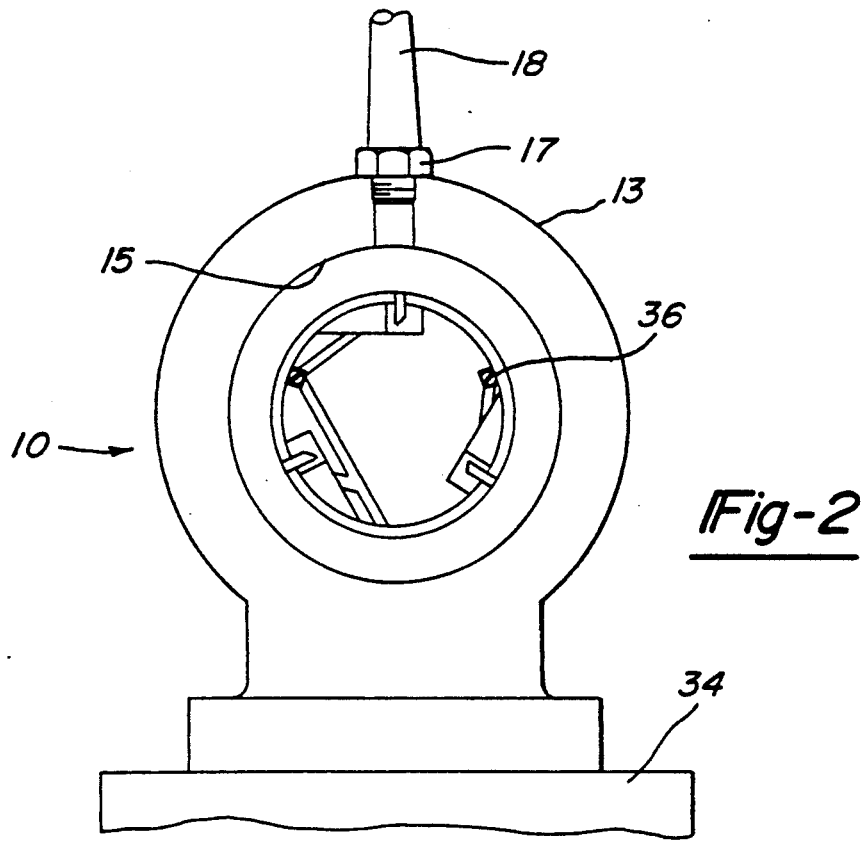
FIG. 2 is a front view of the non contact coolant supply apparatus as shown in FIG. 1.

Turning now to the drawings wherein like numbers relate to like structures, the non contact coolant supply apparatus 10 is comprised of a tool spindle 12 which is of the configuration which is well known to those skilled in the art, and a tool shank 14 which is adapted for rotary cutting of a workpiece. The coolant inducer 16 is a ring shaped apparatus which is equipped with an external coolant supply means 18. The inducer is fixed to a machine slide 34. A fitting 17 is supplied to fasten the coolant supply means to the inducer. An internal coolant passage 20 is formed through the inducer to allow passage of the coolant to the tool shank through the inducer, and is comprised of opposing walls 21. The internal coolant passage passes from the outer peripheral surface 13 to the inner peripheral surface 15 of the coolant inducer. The invention is such that it is optional whether an annular groove 23 may be formed in the inner peripheral surface to form optional coolant reservoir 24 in the coolant inducer. An annular groove 22 is formed in the tool shank and at least one internal helical coolant passage 26, formed in the tool shank, communicates with the annular groove in the tool shank. It is preferred that the helical coolant passage be helixed opposite to the direction of rotation 25 of the tool shank. Affixed to the tool shank are insert cartridge assemblies 28 which are comprised of a cartridge 30 and an insert 32. A coolant plug 36 is provided to prevent the coolant from escaping from the tool shank, and a cross drill passage 38 is provided to allow coolant to pass through the helical passage to the cutting members to facilitate cutting. Preferably, a helical tube 33 is inserted into the helical passage and extends into the annular groove of the tool shank to facilitate passage of the coolant through the passage during rotation by forcing the helical passage to act as an impeller for the passage of coolant. The helical passage initially has a high helical angle, preferably in the range of about 45 to 90 degrees, and which decreases as the passage nears the cutting members until the angle is reduced to approximately 0 degrees. The non-contact coolant inducer is mounted in close proximity with a small clearance between and the tool shank and is preferably mounted with 0.005 inch clearance between the tool shank and the inducer.

The non-contact coolant inducer of the present invention therefore allows introduction of coolant to the cutting members without resort to passage of the coolant through any seals and internal components of the spindle, thereby eliminating wear and corrosion to seals or internal spindle components from coolant borne contaminants.

Those skilled in the art recognize that many modifications and improvements will appear to one skilled in the art without departing from the scope and spirit of the invention.

We claim:

1. A non-contact coolant supply apparatus for a cutting tool for cutting a workpiece wherein there is relative cutting motion about an axis of rotation between a cutting member mounted upon a tool shank, said shank having at least one helical coolant passage opening in the outside diameter of the tool shank, and an annular groove formed therein and a workpiece; wherein coolant is supplied from a coolant supply means through a ring bore defined by ring bore walls which extend from an outer peripheral surface to an inner peripheral surface of a coolant supply ring which is fixedly mounted; said tool shank passing through said coolant supply ring with a close clearance therebetween such that the inner peripheral surface is positioned directly over, and circumferentially surrounds said annular groove in the tool shank so that coolant is introduced through the ring bore to the annular groove on the tool shank, and the rotation of the tool shank causes the helical coolant passage to act as an impeller to force the coolant through the helical coolant passages and into close proximity to the cutting members.

2. The non-contact coolant supply apparatus of claim 1, wherein a tube is inserted into the helical bore and extends into the area of the annular groove.

3. The non-contact coolant supply apparatus of claim 1, wherein the helical coolant passage is helixed in a direction opposite to the direction of rotation of the tool shank.

4. The non-contact coolant supply apparatus of claim 1, wherein the clearance between the inner peripheral surface and the annular groove is 0.005 inches.

5. The non-contact coolant supply apparatus of claim 1, wherein the helical bore, as measured relative to the axis of rotation of the tool, has a high helix angle in the range about 45 to 90 degrees at the annular groove and decreases to about 0 degrees as the tool coolant passage approaches the cutting members.

6. The non-contact coolant supply apparatus of claim 1, wherein there are a plurality of helical coolant passageways in the tool shank.

7. The non-contact coolant supply apparatus of claim 1, wherein an annular recess is formed in the inner peripheral surface of the coolant supply ring to act as a reservoir for the coolant.

* * * * *